(12) United States Patent
Deiss et al.

(10) Patent No.: US 10,232,467 B2
(45) Date of Patent: Mar. 19, 2019

(54) MACHINES FOR THE SEPARATIVE MACHINING OF PLATE-SHAPED WORKPIECES

(71) Applicant: TRUMPF Werkzeugmaschinen GmbH + Co. KG, Ditzingen (DE)

(72) Inventors: Magnus Deiss, Stuttgart (DE); Simon Ockenfuss, Boeblingen (DE); Frank Schmauder, Metzingen (DE); Dennis Wolf, Leonberg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 355 days.

(21) Appl. No.: 15/187,331

(22) Filed: Jun. 20, 2016

(65) Prior Publication Data

US 2016/0288257 A1    Oct. 6, 2016

Related U.S. Application Data

(63) Continuation of application No. PCT/EP2014/077562, filed on Dec. 12, 2014.

(30) Foreign Application Priority Data

Dec. 20, 2013    (DE) .................. 10 2013 226 821

(51) Int. Cl.
*B23K 26/08*    (2014.01)
*B23K 26/38*    (2014.01)
(Continued)

(52) U.S. Cl.
CPC .......... *B23K 26/0876* (2013.01); *B23K 10/00* (2013.01); *B23K 26/083* (2013.01);
(Continued)

(58) Field of Classification Search
CPC ........ B23K 26/08; B23K 10/00; B23K 26/38; B23K 37/23; B26D 7/20
(Continued)

(56) References Cited

U.S. PATENT DOCUMENTS 3,054,333 A    9/1962    Brainard et al.
3,422,246 A    1/1969    Wetzel
(Continued)

FOREIGN PATENT DOCUMENTS

CN    1743131 A    3/2006
CN    101332568    12/2008
(Continued)

OTHER PUBLICATIONS

Office Action in Chinese Application No. 201480069791.1, dated Sep. 21, 2017, 18 pages (with English translation).
(Continued)

*Primary Examiner* — Samuel M Heinrich
(74) *Attorney, Agent, or Firm* — Fish & Richardson P.C.

(57) ABSTRACT

The invention relates machines and methods for separative machining of workpieces. The machines include a first movement unit to move the workpiece in a first direction, a second movement unit including a machining head to emit the processing beam, and a third movement unit. The second movement unit moves the machining head in a second direction perpendicular to the first direction to direct the processing beam onto the workpiece. The machines include a first workpiece support unit including a first workpiece-bearing face and a second workpiece support unit including a second workpiece-bearing face spaced apart by a gap. One or more of at least a part of the first workpiece support unit, at least a part of the second workpiece support unit and at
(Continued)

least one support element are configured to move with respect to one another in the first direction to vary the width of the gap.

26 Claims, 3 Drawing Sheets

(51) Int. Cl.
*B23K 10/00* (2006.01)
*B23K 37/02* (2006.01)
*B26D 7/20* (2006.01)
*B23K 37/04* (2006.01)
*B26F 1/38* (2006.01)
*B26F 3/00* (2006.01)

(52) U.S. Cl.
CPC .......... *B23K 26/38* (2013.01); *B23K 37/0235* (2013.01); *B23K 37/0408* (2013.01); *B26D 7/20* (2013.01); *B26F 1/3813* (2013.01); *B26F 3/004* (2013.01)

(58) Field of Classification Search
USPC .......................... 219/121.67, 121.72, 121.82
See application file for complete search history.

(56) References Cited

U.S. PATENT DOCUMENTS

| | | | |
|---|---|---|---|
| 4,116,097 A * | 9/1978 | Graham | B26D 7/1818 348/88 |
| 4,752,665 A | 6/1988 | del Santo | |
| 4,916,992 A | 4/1990 | Nasu | |
| 4,993,296 A | 2/1991 | Nasu | |
| 6,727,457 B1 * | 4/2004 | Vande Berg | B08B 15/00 219/121.39 |
| 8,256,752 B2 | 9/2012 | Kilian et al. | |
| 8,294,061 B2 | 10/2012 | Schmauder | |
| 9,757,816 B2 | 9/2017 | Fujita et al. | |
| 2003/0066574 A1 | 4/2003 | Lovchik et al. | |
| 2006/0118529 A1 | 6/2006 | Aoki et al. | |
| 2007/0221637 A1 | 9/2007 | Schurmann et al. | |
| 2008/0168876 A1 | 7/2008 | Kilian et al. | |
| 2010/0181165 A1 | 7/2010 | Finn | |
| 2010/0252542 A1 * | 10/2010 | Zeygerman | B08B 15/04 219/121.67 |
| 2013/0277343 A1 | 10/2013 | Finn | |
| 2014/0090443 A1 | 4/2014 | Schmauder et al. | |
| 2014/0216223 A1 | 8/2014 | Epperlein | |

FOREIGN PATENT DOCUMENTS

| | | |
|---|---|---|
| CN | 101415648 | 4/2009 |
| CN | 201346719 | 11/2009 |
| CN | 101873909 A | 10/2010 |
| CN | 102099153 A | 6/2011 |
| CN | 202336634 U | 7/2012 |
| DE | 3509418 A1 | 9/1986 |
| DE | 3620896 A1 | 1/1987 |
| DE | 3917253 C2 | 1/1994 |
| DE | 102004059766 | 6/2006 |
| DE | 102011051170 A1 | 12/2012 |
| DE | 102011054360 A1 | 4/2013 |
| DE | 102011054361 A1 | 4/2013 |
| EP | 927597 A1 | 7/1999 |
| EP | 2 008 752 | 12/2008 |
| EP | 1901893 B1 | 3/2011 |
| EP | 2527058 A1 | 11/2012 |
| JP | 61206586 A | 9/1986 |
| JP | 63278694 A1 | 11/1988 |
| JP | 2030332 A1 | 1/1990 |
| JP | 02274494 A | 11/1990 |
| JP | 5050346 A1 | 3/1993 |
| JP | 6170469 A1 | 6/1994 |
| JP | H06170469 | 6/1994 |
| JP | 07290267 A | 11/1995 |
| JP | 10118879 A | 5/1998 |
| JP | H 10-166175 | 6/1998 |
| JP | H 10 296478 | 11/1998 |
| JP | 2000246564 A1 | 9/2000 |
| JP | 2001/170727 | 6/2001 |
| JP | 2003245838 A1 | 9/2003 |
| JP | 2004050184 A1 | 2/2004 |
| JP | 2007160811 | 6/2007 |
| JP | 2008264996 | 11/2008 |
| JP | 2012515657 | 7/2012 |
| JP | 2013119101 A | 6/2013 |
| WO | WO 2008/138370 | 11/2008 |
| WO | WO 2010/085486 | 7/2010 |
| WO | WO2013053569 A1 | 4/2013 |

OTHER PUBLICATIONS

Office Action in Japanese Application No. 2017-548287, dated Jul. 12, 2018, 6 pages (with English translation).

* cited by examiner

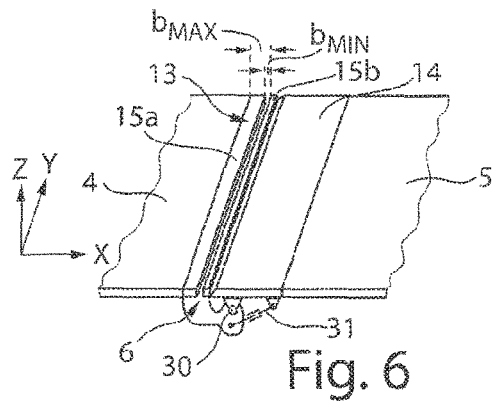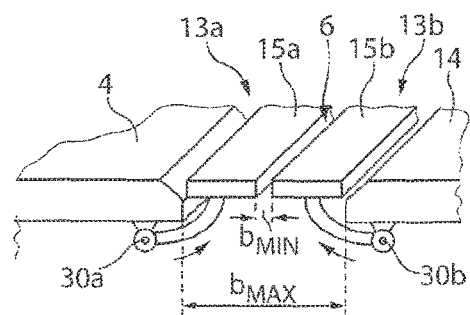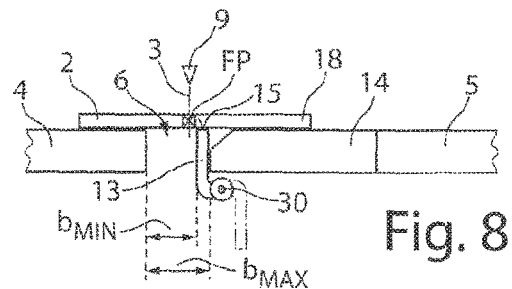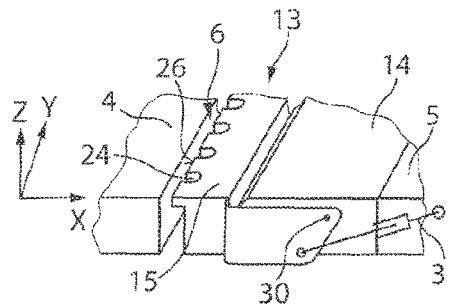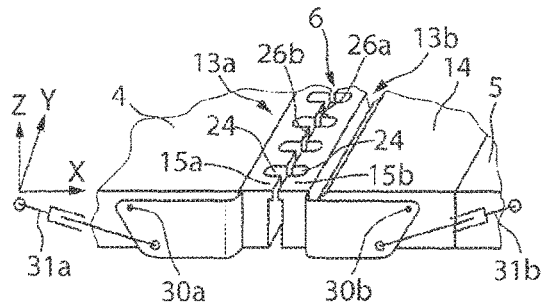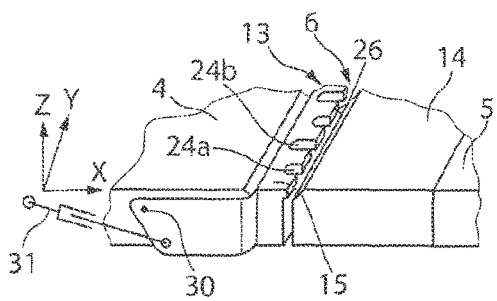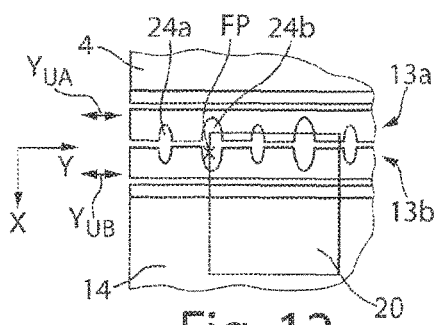

MACHINES FOR THE SEPARATIVE MACHINING OF PLATE-SHAPED WORKPIECES

CROSS-REFERENCE TO RELATED APPLICATIONS

This application is a continuation of and claims priority under 35 U.S.C. § 120 to PCT Application No. PCT/EP2014/077562 filed on Dec. 12, 2014, which claims priority to German Application No. DE 10 2013 226 821.1, filed on Dec. 20, 2013. The entire contents of both of these priority applications are incorporated herein by reference.

TECHNICAL FIELD

The present disclosure relates to machines that cut workpieces using processing beams such as laser beams.

BACKGROUND

Japanese patent publication JP 5050346A discloses a machine for separative machining of plate-shaped workpieces by means of a laser beam, in the form of a combined laser and punch machine. The machine disclosed by JP 5050346A implements hybrid motion control in which the workpiece is moved in a first direction (direction X), and the machining head is moved in a second direction (direction Y). The workpiece bearing is discontinuous in the displacement range of the machining head to prevent the workpiece bearing from being in a line of sight of the processing beam to avoid damaging the workpiece bearing by the processing beam. In particular, the workpiece bearing may be split and/or include a gap that extends in the Y direction between two workpiece bearing faces or workpiece bearings. The processing beam that has passed through the workpiece and any slag and cutting waste that may arise are expelled through this gap. The processing beam may be a laser beam, but the use of another type of high power beam, for example in the form of a plasma arc, or of a water jet, is also possible.

When such a laser processing machine has an additional axis for moving the machining head in the direction X, it is advantageous for the gap in the workpiece bearing to have a minimum width that corresponds to at least a displacement range of the machining head in the direction X. By means of the additional axis the machining head may be displaced with a high level of dynamics within the gap. Moreover, a wide gap allows small to medium-size cutting waste, residual mesh parts, or comparatively small workpiece parts, which may be separated from one another and from the slag with the aid of parts chutes, for example, to fall freely. In this way, small parts may be removed from the cutting region in a significantly more rapid manner than by way of the pivoting movement of a discharge flap provided for this purpose.

However, a large gap width may also have a negative effect when cutting off comparatively small workpiece parts, since small workpiece parts are not adequately supported in the gap region and by virtue of the high gas pressure of the cutting gas that exits from the processing nozzle on the machining head and impacts the cut off workpiece parts, the small workpiece parts potentially tilt in the gap and in some instances potentially catch on the residual workpiece.

German patent publication DE 10 2011 054 360 A1 discloses a machine tool, in particular a laser processing machine, which has a workpiece bearing for receiving plate-shaped materials, as well as a separation device having a machining head that is displaceable at least in the direction Y. The workpiece bearing has a first bearing table having a first bearing face, and a second bearing table having a second bearing face, wherein the bearing faces for forming a gap are mutually spaced apart underneath the machining head, and wherein the position of the gap and the width of the gap in the machining region of the separation procedure is adjustable by the mutual positioning of the bearing tables in the direction X. A controller unit is provided that controls a displacement movement of the bearing tables such that a gap width between the bearing tables is adjustable, the gap width being adapted to a size of a workpiece part or a waste part that is to be downwardly discharged through the gap between the bearing tables.

Japanese patent publication JP 2003-245838 A discloses a machine for machining plate-shaped workpieces for a cutting plate. The machine has a gap having an adaptable gap width to be disposed within a discharge flap of a workpiece bearing that is capable of being opened and closed and for a further discharge flap that is contiguous to the cutting plate to be provided. The gap width may be adjusted so as to depend on the dimensions of workpiece parts, or of scrap parts, respectively, to be discharged.

German patent publication DE 36 20 896 A1 discloses a support and transport device for planar workpieces that comprises at least one endless conveyor belt that in the region of a cutting tool is guided over a deflection roller that is mounted on a slide that is displaceable in a controlled manner in the longitudinal direction of the machine, so as to be synchronous with the cutting tool. A robust safety bar may be inserted into the gap between the conveyor belts.

Japanese patent publication JP 2013-119101 A discloses a machine for the thermal processing of workpieces, in which a machining head moves in one direction (direction Y) across the workpiece. In the case of the machine, an opening at which the machining head in the movement thereof in the direction Y is momentarily located is formed only in one region of the workpiece bearing, i.e., the movement of the opening is synchronized with the movement of the machining head in the direction Y. A plurality of pairs of plates are disposed on the workpiece bearing in the region of the displacement path of the machining head in the direction Y. The plates of a respective pair of plates for forming the opening are moved apart from one another in the direction X, as soon as the machining head moves in the direction Y to the position of a respective pair of plates.

Japanese patent publication JP 63278694 A describes a workpiece table for laser cutting, in which a support plate is pivoted in a motorized manner to a horizontal position, so as to prevent an inclination of the workpiece material immediately prior to cutting. The support plate is provided between the support pins that are disposed in a grid pattern and which support the workpiece during machining by cutting.

US patent publication US 2010/0181165 A1 discloses a machine for cutting to shape a strip-shaped material that is conveyed from a coil. The machine includes a first row of conveyor belts that are aligned so as to be mutually parallel and a second row of conveyor belts that are aligned so as to be mutually parallel. A portal system having two mutually reliant axes enables movement of a laser processing head in two directions. A gap that is formed between the conveyor belts of the first and of the second row forms an opening or a path, respectively, for the passage of the laser beam when producing a cut. The conveyor belts are displaceable in the longitudinal direction of the strip-shaped material so as to generate a gap corresponding to that profile that is to be cut on the strip-shaped material by means of the laser beam.

US patent publication US 2006/0118529 A1 also describes a machine for laser cutting strip-shaped materials that are conveyed from a strip along an indexing direction. The machine has a laser processing head that is moveable in the feed direction (direction X) and transversely to the feed direction (direction Y). The machine has two conveyor belts that are disposed ahead of and behind the laser processing head, respectively, in the feed direction and that serve for supporting the strip-shaped material or for supporting workpiece parts that are cut therefrom, respectively.

Japanese patent publication JP 2004-050184 A discloses a support table mechanism for a workpiece, in which two strip surfaces that are disposed in approximately the same plane may be disposed so as to be closer to or farther apart from one another, so as to support a workpiece or a workpiece part, respectively, is described in. Rollers having movable axes are provided, so as to form an opening region between the two strip surfaces. Opening and closing of the opening region is controlled by displacing the axial positions of the rollers.

SUMMARY

The present disclosure relates to machines for the separative machining, e.g., cutting and stamping, of plate-shaped workpieces, such as laser processing machines, that during separative machining enable improved support of workpiece parts, and in particular enable simplified discharging of cut off workpiece parts.

In certain embodiments, this is achieved by machines described herein. The machines include a first movement unit configured to move the workpiece in a first direction (X). The machines include a second movement unit that includes a machining head that emits a processing beam. The second movement unit is configured to move the machining head in a second direction (Y) perpendicular to the first direction (X) to direct the processing beam onto the workpiece. The machines include a first workpiece support unit including a first workpiece bearing face for supporting the workpiece. The machines include a second workpiece support unit including a second workpiece bearing face for supporting the workpiece. The first workpiece support unit and the first workpiece bearing face are spaced apart by a gap from the second workpiece support unit and the second workpiece bearing face. The gap extends along the second direction (Y). One or more of at least a part of the first workpiece support unit and at least a part of the second workpiece support unit may be configured to move with respect to one another in the first direction (X) to vary the width (b) of the gap. The machines include a third movement unit for moving the machining head in the first direction within the gap. In some embodiments, the machines comprise at least one support element that is disposed between the first and the second workpiece support unit and is movable in the first direction (X) between the first workpiece bearing face and the second workpiece bearing face to vary the width (b) of the gap, the at least one support element having a bearing face for supporting workpiece parts that are cut during separative machining. In particular in this case, the first and second workpiece support units may be stationary.

In certain implementations, the machine is configured such that the width of the gap is variable in the second direction (direction Y) only across the entire length of the gap. However, the machine may also be configured such that the width of the gap is variable in the direction Y in one or a plurality of parts, part-regions, or portions, respectively. The position of a part in the direction Y, at which the width of the gap is varied, in this case may optionally be varied so as to be synchronous with the movement of the machining head in the direction Y. In particular, the gap here may be constricted in the direction Y in a portion that corresponds to the position of the machining head in the direction Y, so as to enable, if required, planar support of a part-region of the workpiece that is momentarily being processed by the processing beam, or of a workpiece part that has been cut off from the workpiece, respectively. In particular embodiments, the maximum displacement range of the third movement unit in the direction Y corresponds at most to the maximum width of the gap.

In certain embodiments, the machine comprises a controller unit that is configured or programmed, respectively, for reducing the width of the gap to a minimum gap width when cutting off a workpiece part to be supported or prone to tilting, the minimum gap width being smaller than a maximum displacement range of the third movement unit in the direction X. In this embodiment, the width of the gap is thus reduced to the minimum gap width prior to the last connection between the workpiece part and the residual workpiece being severed. The workpiece part prone to tilting may be a workpiece part that has insufficient flexural rigidity and/or that has inadequate dimensions for bridging the gap after being cut off, without the gap width being reduced.

The minimum gap width can correspond to the gap width that is just required for machining by cutting. The minimum gap width is determined by the requirement that no contamination or damage by the processing beam and by slag that may be formed under certain circumstances on the lateral peripheries of the constricted gap should occur. For example, a minimum gap width in the direction X that enables this may be approx. 5 mm or less. In the case of a machine on which at least one recess or opening, respectively, is formed on at least one construction element that delimits the gap, the minimum gap width may be 0 mm, i.e., the gap may optionally be completely closed. It is self-evident that the minimum gap width should be smaller than the dimensions in the direction X of a workpiece part to be cut off, since planar support of the workpiece part may only be performed in this case. In particular, the minimum gap width when cutting off the workpiece part is less than the width of the gap when cutting the remaining contour of the workpiece part.

A workpiece bearing face in the context of this application is understood to be a workpiece bearing that is suitable for supporting the plate-shaped workpiece in a planar manner. Such a workpiece bearing face need not form a continuous surface; rather, it suffices for the workpiece to be supported at a plurality of points (at least three, typically significantly more) by bearing elements (optionally only in a punctiform manner), so as to mount the workpiece in one bearing plane. The workpiece bearing face in this case is formed by the upper sides of the bearing elements. The workpiece bearing faces between which the gap is formed may be configured in the form of a brush table or a ball table, for example. The workpiece to be machined during machining is in this case supported by many bearing elements in the form of brushes or (rotatable) balls that are disposed on or in a table surface, respectively, and that collectively form the workpiece bearing face. Alternatively, rotatable rollers that are disposed so as to be parallel with the gap and the rotation axis of which extends parallel with the gap may be provided as bearing elements for forming workpiece bearing faces. Moreover, it is possible for the workpiece bearing faces to be designed as revolving bearing belts.

In certain embodiments, the position of the gap in the first direction is variable so as to be synchronous with the movement of the machining head in the first direction (direction X). In the case of the movement of the machining head moving in the additional axis in the direction X, the gap may be conjointly guided or displaced, respectively, such that the processing beam may pass through the gap at all times. The synchronous movement of the machining head and of the gap in the direction X also enables the position of the separating cut position to be varied in the direction X.

In some advantageous embodiments, the width of the gap is variable by movement of at least one of the workpiece bearing faces in the first direction (direction X), by movement of at least one part-region of at least one of the workpiece bearing faces in the first direction, and/or by movement of at least one support element that is movable between the workpiece bearing faces in the first direction, the support element having a bearing face for supporting workpiece parts that are cut during cutting, wherein the position of the gap in the first direction is preferably variable so as to be synchronous with the movement of the machining head in the first direction. The movement of the workpiece bearing face(s), of the part-region or part-regions, respectively, of the workpiece bearing face(s), and/or of the support elements, may be performed with the aid of a controller unit that is configured or programmed, respectively, for adjusting the width of the gap in dependence on the size, the contour shape or the external contour, respectively, and/or on the thickness or flexural rigidity, respectively, of a workpiece part that is to be momentarily cut. The workpiece bearing faces, the part-regions of the workpiece bearing faces, and/or the support elements may optionally and additionally be displaceable in a controlled manner in the direction Y.

For example, the two workpiece bearing faces, or part-regions of the workpiece bearing faces that are disposed on either side of the gap, for example, and extend across the entire gap length, may be displaceable in the direction X both in relation to one another as well as in a mutually synchronous manner and so as to be synchronous with the movement of the machining head. In addition to the position of the gap, the width of the gap may also be adapted in this manner to the size, the contour shape, and the thickness of a respective workpiece part to be cut; large and stable or flexurally rigid workpiece parts, respectively, may be cut at a large gap width, so as to avoid any contamination of the workpiece bearing faces, while the workpiece bearing faces or part-regions of the workpiece bearing faces, respectively, at least for cutting off small workpiece parts may be converged so as to constrict the gap.

As is the case with the workpiece bearing faces, the support elements on that side thereof that face the workpiece may also have a continuous bearing face that may be brought to bear on the lower side of the workpiece. Alternatively, the support elements may have a plurality of bearing elements in the form of bearing pins, balls, brushes, or webs, for example, which collectively form the bearing face on which the workpiece or cut off workpiece parts may bear.

In some implementations, the controller unit is configured or programmed, respectively, for controlling the movement of the at least one workpiece bearing face, of the at least one part-region of the at least one bearing face, and/or of the at least one support element such that when cutting off a workpiece part to be supported, the width of the gap is reduced to a minimum gap width that is smaller than a displacement range of the third movement unit (additional axis) in the direction X, i.e., smaller than the width of the movement region of the processing beam. In particular embodiments, the gap width is reduced to a gap width that is still just sufficient for the passage of the processing beam. When cutting small or thin (flexible) workpiece parts, the gap for planar support of the workpiece parts is thus constricted and may optionally be guided conjointly with the movement of the machining head in the direction X. When cutting off small workpiece parts that are prone to tilting, the gap has the minimum possible gap width thereof, as has been described above.

In further embodiments, the controller unit is configured or programmed, respectively, for controlling the position of the gap in the first direction such that a separating cut position of the workpiece part to be supported is positioned within the gap having the minimum gap width. In this manner, the position of the separating cut position in the direction X may be varied so as to depend on the geometry, the dimensions, and the flexural rigidity of the workpiece. As has been described above, in the case of at least one recess being provided in a component delimiting the gap, for example in a support element, the gap may be completely closed for separative cutting when the separating cut position is positioned within the recess.

In some embodiments, the controller unit is configured or programmed, respectively, for controlling the movement of the at least one workpiece bearing face, of the at least one part-region of at least one of the workpiece bearing faces, and/or of the at least one support element such that the gap has a maximum gap width when cutting workpiece parts that cover the gap in the first direction. Large and flexurally rigid workpiece parts should be cut at a large gap width, ideally at the maximum gap width, so as to avoid any contamination of the peripheries of the components that delimit the gap, for example of the support element or the support elements, respectively.

In some embodiments, at least two, in particular precisely two, support elements that are displaceable in the first direction (direction X) are disposed in the locationally fixed gap between the workpiece bearing faces that are configured so as to be stationary. The total width of the bearing faces of the support elements in the direction X does not fully fill the gap in the direction X such that the gap width may be varied by displacing the support elements in the direction X. In the direction Y, the bearing faces of the support elements may extend across the entire cutting region or across the entire length of the gap, respectively. However, it is also possible for a plurality of such support elements to be disposed beside one another in the direction Y.

During machining of the workpiece, the support elements may be displaced in the direction X, so as to be synchronous with the movement of the machining head, such that the processing beam is always positioned within a cutting region, having a gap width which in relation to the mutual spacing between the two workpiece bearing faces is constricted. This gap, or this constricted cutting region, respectively, may be formed either in the direction X between the support elements, or else between a support element on one side and the lateral periphery of a stationary workpiece bearing face that extends in the direction Y, or optionally on a discharge flap.

In certain embodiments embodiment, the majority of the plate-shaped workpiece is supported by the stationary workpiece bearing faces, only the narrow support elements being moved in the direction X between the stationary workpiece bearing faces. Since these support elements have a smaller mass than the stationary workpiece bearing faces, significantly more rapid movement of the support elements is possible. Just prior to a workpiece part being cut off, the support elements are positioned closely beside one another such that the remaining gap becomes as small as possible, assuming the minimum gap width thereof.

In certain embodiments, at least one peripheral region of a support element that faces a workpiece bearing face, and at least one peripheral region of at least one of the (stationary) workpiece bearing faces that faces the support element are configured so as to be comb-shaped, such that the workpiece bearing face and the support element mesh in the case of movement in the direction X, and in the case of movement of the support element in the direction X only small regions of the workpiece or of the cut workpiece parts, respectively remain without support.

In some embodiments, at least one support element, preferably two or more of the support elements, is/are configured so as to be extendable from one of the workpiece bearing faces. In this embodiment the support element or support elements, respectively, may be deployed like drawers from the stationary workpiece bearing faces, or the support elements may be at least partially displaced in the direction X below a respective workpiece bearing face, respectively. In order for the workpiece to be supported, the support element or support elements, respectively, at least in one part-region that is inserted under the workpiece bearing faces may have brushes that are erected during extension, such that the upper side of the brushes for supporting the workpiece is flush with the workpiece bearing faces.

In some embodiments, at least one support element, preferably two or more of the support elements, is/are displaceable in a controlled manner in the second direction (direction Y). In this embodiment, at least two support elements that are displaceable both in the direction X as well as in the direction Y may be disposed between the workpiece bearing faces. The at least two support elements may be attached to the same stationary workpiece bearing face. Alternatively, at least one support element may be attached to each of the two workpiece bearing faces.

In certain embodiments, the support elements can be conjointly guided in a manner synchronous with the movement of the machining head both in the direction X as well as in the direction Y. The gap formed between the support elements may be constricted just prior to separative cutting. If and when two support elements that are each displaceable in the direction X and in the direction Y are attached to each of the two stationary workpiece bearing faces that delimit the gap, the opening that is formed between the support elements for the processing beam when cutting off a workpiece part may then be formed in a highly flexible manner by the interaction of the support elements.

In one further embodiment, at least one of the support elements on an external edge that faces the gap or the cutting region, respectively, has a recess in the bearing face. To support very small workpiece parts, a recess or a groove, respectively, may be provided on one or a plurality of the support elements. In this manner, it is possible for the support elements to be completely converged such that the gap between the support elements during separative cutting is completely closed, only a small opening that is formed by the recess or by two mutually contiguous recesses remaining, through which opening the processing beam passes when the workpiece part is being cut off. The opening between the support elements, or the recess, respectively, here follows the movement of the machining head in the direction X and in the direction Y. A recess in the form of a chamfered edge or a rounded feature on a corner of an external edge of one or of a plurality of the support elements that faces the gap may also be formed instead of a groove.

In some embodiments, the bearing face of at least one support element and/or at least one of the support elements per se are/is displaceable in the direction of gravity and/or are/is downwardly pivotable. In this case, discharging of cut off workpiece parts may be performed by lowering the support elements or the bearing faces thereof, respectively, and subsequently pivoting the bearing faces downward, or by rapidly moving the bearing faces apart in the direction X. Alternatively, a pure pivoting movement of the bearing faces or of the support elements, respectively, is also possible in order for workpiece parts to be discharged.

In certain embodiments, the width of the gap disposed between the workpiece bearing faces is minimizable by inwardly pivoting at least one support element between the workpiece bearing faces, the support element having a bearing face for supporting workpiece parts cut during cutting. In such embodiments, one or a plurality of pivotable support elements are disposed so as to be contiguous to the gap (having the maximum gap width) formed between the workpiece bearing faces either on both sides or only on one side. As opposed to multiple embodiments described above, the gap width by inwardly pivoting the support element or support elements, respectively, cannot be minimized in a continuous manner but only in discrete steps. In this embodiment, the gap width is typically variable only between a maximum gap width, in which the support element or support elements, respectively, is/are disposed in a retracted position, and a minimum gap width, in which the support element or support elements, respectively, are inwardly pivoted into the gap. If there are two inwardly pivotable support elements, a gap having a width that is between the maximum and minimum gap width may be produced by inwardly pivoting only one of the support elements.

When cutting large workpiece parts that cover the gap at the maximum gap width thereof, the support elements are pivoted out of the cutting region or out of the gap, respectively, in the retracted position being disposed below the workpiece bearing faces, for example, in which the support elements do not protrude into the gap. When cutting workpiece parts that are prone to tilting, the at least one support element at least prior to separating cutting is inwardly pivoted into the gap such that the gap width is minimized and the workpiece part to be cut off is supported in a planar manner. In the inwardly pivoted position into the gap, the bearing face of the at least one support element is horizontally aligned and is located level with the workpiece bearing faces. When cutting off a tilting-prone workpiece part that is to be supported, the processing beam is positioned so as to be adjacent to an edge of the bearing face of the inwardly pivoted support element or support elements, respectively, that runs in the direction Y.

In some further embodiments, the support element on an external edge of the bearing face that faces the gap has at least one recess, preferably a plurality of recesses, for the passage of the processing beam when cutting off a workpiece part. The gap width required for the passage of the processing beam, in the case of a constricted gap, may be reduced with the aid of the recess(es), since cutting, in particular cutting off, of the workpiece part, i.e., the complete release of the workpiece part from the residual workpiece, may be performed within the recess. If the separating cut position is disposed within the recess, the gap optionally may be completely closed during separating cutting. In this manner, the width of the bearing face of the support element that is inwardly pivotable into the gap may be enlarged, the planar support of workpiece parts thus being able to be improved.

In some embodiments, one inwardly pivotable support element in each case is disposed on either side of the gap, mutually facing external edges of the support elements each having at least one recess for the passage of the processing beam. In this embodiment, the recesses on the external edges are disposed in the direction Y so as to be mutually opposite, such that the recesses in the inwardly pivoted position of the support elements into the gap form a common opening through which the processing beam may pass. In particular, the recesses may be configured so as to be mutually complementary, i.e., the opening that is formed by the recesses has two mirror-symmetrical halves. The recesses may have a geometry that is semi-circular, oval, or rectangular, for example, collectively forming a circular, oval, or rectangular opening, in particular a square opening.

In some embodiments, at least one external edge of a support element has a plurality of recesses in a comb-shaped arrangement, i.e., the recesses are disposed so as to be identically spaced apart from one another along the external edge of the support element that extends in the direction Y. The recesses formed on the external edge may be of dissimilar size and optionally of dissimilar geometry. For example, the recesses may be configured so as to be semi-circular, oval, or rectangular. In particular, two or more types of recesses of dissimilar size and/or geometry may be formed on the external edge, the recesses alternating along the external edge. For example, recesses having alternatingly smaller and larger hole sizes may be disposed along the external edge.

If the at least one inwardly pivotable support element has a plurality of recesses it is favorable for the support element to be configured so as to be displaceable in the direction Y. The movement range of the support element in the direction Y in this case typically corresponds to the spacing between the centers of two mutually adjacent recesses, or to the spacing between the centers of two mutually adjacent recesses of the same type. Such a movement range is typically sufficient in order for a recess that is suitable for separative cutting to be positioned at each position in the direction Y by displacing the support element or support elements, respectively, in the direction Y.

In some embodiments, a pivotable and/or lowerable discharge flap is attached so as to be adjacent to at least one of the workpiece bearing faces. By pivoting and/or lowering the discharge flap that is disposed so as to be adjacent to the gap, workpiece parts that in particular are flexurally rigid and cover the gap may be removed from the cutting region. The discharge flap typically extends across the entire length of the gap or of the displacement range of the machining head in the direction Y, respectively, and in the direction Y optionally may have a plurality of segments that are individually pivotable. The support element or support elements, respectively, may be mounted on the workpiece bearing face that is attached so as to be adjacent to the discharge flap, or be mounted on the discharge flap per se. In the case of the latter, a respective support element is pivoted or lowered conjointly with the discharge flap, respectively.

Further aspects of the invention relates to methods for separative machining of a workpiece on a machine as described above. The method include setting the width of the gap so as to depend on at least one of size, contour shape and/or the thickness of the workpiece part to be cut. As has been described above in the context of the controller unit, the width of the gap for supporting tilting-prone workpiece parts that typically are small or not flexurally rigid, respectively, in particular during separative cutting, may be minimized. When machining larger and flexurally rigid workpiece parts that are not prone to tilting and typically bridge the gap, the gap may be opened further, in particular having the maximum possible width thereof.

In certain implementations, the gap is conjointly moved so as to be synchronous with the movement of the machining head in the first direction. In the case of this variant, the gap in the case of the movement of the processing beam in the additional axis in the direction X may be guided in a conjoint manner such that the processing beam when cutting may pass through the gap at all times.

In some implementations, when cutting off a workpiece part to be supported the width of the gap, in particular by moving at least one of the support elements, is reduced to a minimum gap width that is smaller than a maximum displacement range of the additional axis or of the third movement unit, respectively. In particular, the width of the gap can be reduced to a minimum gap width that is still just sufficient for the passage of the processing beam. The width of the gap may be reduced to the minimum gap width by inwardly pivoting at least one support element into the gap, for example. If one or a plurality of support elements is/are disposed between the workpiece bearing faces, or is/are configured so as to be deployable from the workpiece bearings, the gap may be minimized to the minimum gap width by displacing at least one such support element in the direction X.

As has been described above, the minimum gap width may be a gap width that is required for machining by cutting and that is sufficiently large so as to prevent any contamination or damage by the processing beam and optionally by slag that forms on the lateral peripheries of the constricted gap. The minimum gap width may also be 0 mm, as long as at least one recess or opening, respectively, for the passage of the processing beam is formed on construction elements that delimit the gap, in particular on the support elements.

In some embodiments, for discharging a cut off workpiece part the gap is widened in particular by moving at least one support element in the direction X. For this purpose, the at least one support element may be displaced in the direction X. As has been described above, the movement of the support element by virtue of the smaller mass to be moved is typically more rapid than the movement of a discharge flap that is disposed so as to be adjacent to a workpiece bearing face, for example, such that rapid discharging of the workpiece part may be performed through the widened gap.

In particular, the gap may be widened by a counteracting and in particular synchronous movement of at least two support elements in the first direction (direction X). The movement of the two support elements is typically performed so as to be synchronous, i.e., at the same rate of acceleration or at the same speed, respectively, but in opposite directions (positive and negative directions X, respectively), such that the cut off workpiece part in the case of the counteracting movement of the two support elements is not laterally displaced.

In some embodiments, at least one support element, and/or the at least one support element per se are/is downwardly pivoted for discharging the cut off workpiece part the bearing face. In this variant, at least one support element that is inwardly pivotable between the workpiece bearing faces may be downwardly pivoted into a retracted position, so as to widen the gap. In particular, inwardly pivotable support elements that are attached to either side of the gap may be downwardly pivoted in synchronous movement, so as to discharge the cut off workpiece part through the gap, ideally in a freely falling manner.

Support elements that are disposed between the workpiece bearing faces, or support elements, or the bearing faces thereof, respectively, which are extendable from the workpiece bearing faces, may also be configured so as to be downwardly pivotable, so as to achieve rapid discharging of cut off workpiece parts.

Optionally, the bearing faces may also be pivoted in relation to a main body of the support elements in order for workpiece parts to be discharged.

In some embodiments, the bearing face of at least one support element, and/or the support element per se prior to discharging or during discharging of the cut off workpiece part are/is lowered. The lowering movement of the bearing faces or of the support elements, respectively, in particular may be performed prior to the pivoting movement that has been described above, or be superimposed by the latter. In this manner, it may be ensured that workpiece parts may be removed in a downward and process-reliable manner from the residual grate or from the residual workpiece, respectively, and that the workpiece parts do not catch on the residual workpiece when being discharged. The support elements may be lowered in a synchronous or mutually independent manner. Alternatively or additionally, the bearing faces of the support element may be lowered in relation to a main body of the support elements.

The invention also relates to computer program products that are configured for carrying out all steps of the method described above, when the computer program runs on a data processing system. The computer program products include non-transitory computer-readable storage device storing computer executable instructions for regulating separative machining of a workpiece in a machine. The instructions are configured such that if they are executed by a computer system, they cause the computer system to set the width (b) of a gap formed between a first workpiece support unit including a first workpiece-bearing face for supporting the workpiece and a second workpiece support unit including a second workpiece bearing face for supporting the workpiece, The width (b) is set in dependence on at least one of a size, a shape, and a thickness of a workpiece part to be cut. The instructions are further configured to cause the workpiece to be machined the workpiece via a first movement unit configured to move the workpiece in a first direction (X). A second movement unit configured to move a machining head configured to emit the processing beam, wherein the second movement unit is configured to move the machining head in a second direction (Y) perpendicular to the first direction (X) to direct the processing beam onto the workpiece. The instructions are further configured to cause a third movement unit for moving the machining head in the first direction (X), wherein one or more of at least a part-region of the first workpiece support unit, at least a part-region of the second workpiece support unit and at least one support element that is movable between the first workpiece bearing face and the second workpiece bearing face are configured to move with respect to one another in the first direction (X) to vary the width (b) of the gap.

In particular embodiments, the data processing system may be a controller unit of the machine on which a machining program that is substantially composed of a sequence of control commands for coordinating the movements of the workpiece, of the machining head and of the optionally present support elements, is run.

Further advantages of the invention are derived from the description and the drawing. The aforementioned features and those to be listed hereunder likewise may be used individually or in arbitrary mutual combinations. The embodiments shown and described are not to be understood as a complete enumeration but are rather exemplary in terms of outlining the invention.

DESCRIPTION OF DRAWINGS

FIG. 6 shows an illustration of a support element which is inwardly pivotable between two workpiece bearing faces, a gap being formed in the support element.

FIG. 7 shows an illustration which is analogous to FIG. 6, having two inwardly pivotable support elements which are attached to opposite sides of the gap.

FIG. 8 shows an illustration which is analogous to FIGS. 6 and 7, having an inwardly pivotable support element in the form of a pivot arm.

FIG. 9 shows an illustration which is analogous to FIGS. 6 to 8, having an inwardly pivotable support element to which a plurality of recesses for the passage of a laser beam are attached.

FIG. 10 shows an illustration that is analogous to FIG. 7, in which a plurality of complementary recesses are formed on both the support elements;

FIG. 11 shows an illustration that is analogous to FIG. 9, in which the recesses in the support element are of different size; and FIG. 12 shows an illustration that is analogous to FIG. 10, in which the recesses in the support elements are each of a different size.

DETAILED DESCRIPTION

Identical reference signs are used for identical components and for components with identical functions, respectively, in the following description of the drawings.

Figure 1:
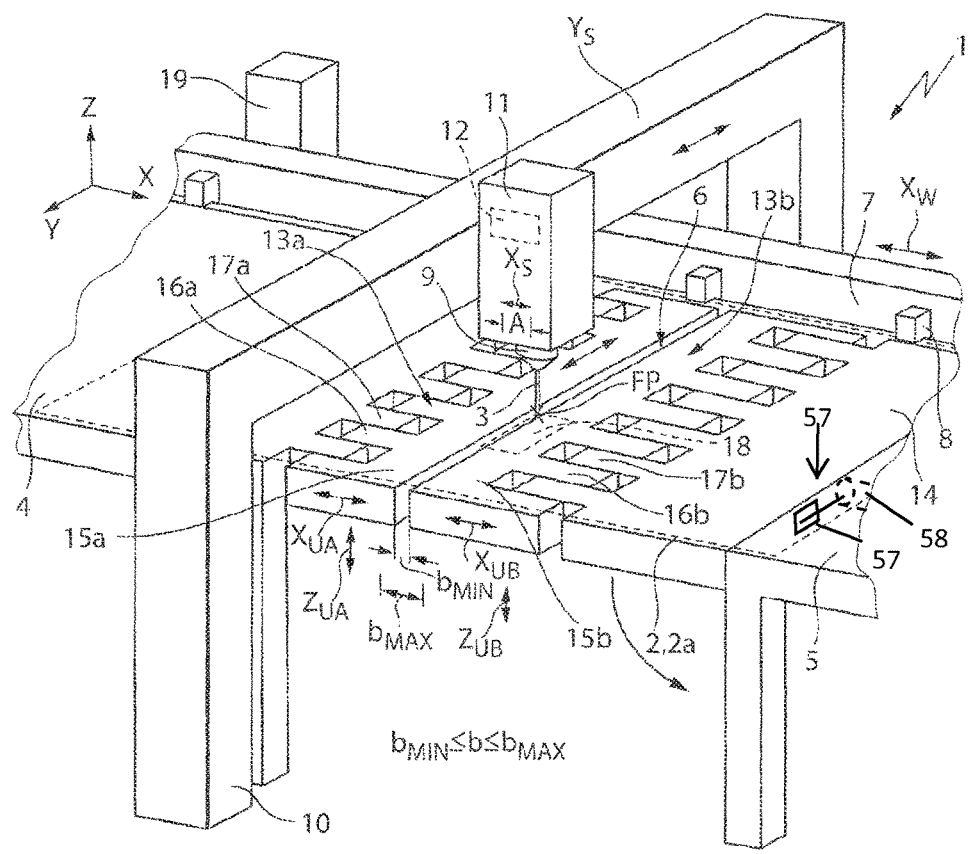
FIG. 1 shows an illustration of an exemplary embodiment of a laser processing machine having two support elements that when cutting off a workpiece part reduce the width of a gap formed between the support elements to a minimum gap width.

FIG. 1 shows an exemplary construction of a machine 1 for laser processing, more specifically for laser cutting, of a panel-shaped workpiece 2 by means of a laser beam 3, the panel-shaped workpiece 2 being illustrated by dashed lines. For machining the workpiece 2 by cutting, another type of thermal processing beam, for example a plasma torch, or a water jet, may also be employed instead of the laser beam 3. The workpiece 2 during machining bears on two workpiece bearing faces 4, 5, which in the example shown form the upper sides of two workpiece tables, defining a bearing plane (X-Y plane of an XYZ coordinate system) for bearing the workpiece 2. The workpiece bearing faces 4, 5 may be formed by the table surfaces or by pin-shaped bearing elements (pins), bearing belts, brushes, rollers, balls, air cushions, or the like.

By means of a conventional movement and retention unit 7 that has a drive and clamping units 8 in the form of chucking jaws for fixedly holding the workpiece 2, the workpiece 2 may be displaced in a controlled manner on the workpiece bearing faces 4, 5 in a first movement direction X (hereunder the direction X) and moved to a pre-defined workpiece position W. In order for the movement of the workpiece 2 in the direction X to be facilitated, brushes, balls, or slide rollers may be attached to the workpiece tables shown in FIG. 1, which form the actual bearing faces 4, 5 for the workpiece 2. Alternatively, in order for the workpiece 2 to be moved in the direction X, or for the movement to be supported, it is possible, for example, for the workpiece bearing faces 4, 5 per se to be designed as a movement units, for example in the form of a (revolving) conveyor belt, such as is described in DE 10 2011 051 170 A1 of the applicant, or in the form of a workpiece bearing as is described in JP 06170469.

A gap 6 extends in a second direction (hereunder the direction Y) across the entire displacement path of a laser cutting head 9. The laser cutting head 9 directs the laser beam 3 onto the workpiece 2 and focuses the former on the latter, is formed between the two workpiece bearing faces 4, 5, more specifically between two support elements 13a, 13b that are disposed between the workpiece bearing faces 4, 5. The laser cutting head 9 by means of a driven slide 11 that serves as a movement unit 12 and that is guided on a stationary portal 10 is displaceable in a controlled manner in the direction Y within the gap 6. The laser cutting head 9 is additionally also displaceable in a controlled manner in the direction X and may be displaced in a controlled manner with the aid of an additional movement unit 12, for example in the form of a linear drive, attached to the slide 11, in the direction X. The movement unit 12 here has a maximum displacement range A in the direction X that corresponds to at most the maximum gap width bMAX of the gap 6.

In the case of the example shown in FIG. 1, a discharge flap 14 that is downwardly pivotable for discharging workpiece parts, as is indicated by an arrow in FIG. 1, is attached so as to be contiguous to the second workpiece bearing face 5. A first support element 13a is disposed so as to be adjacent to the first workpiece bearing face 4, and a second support element 13b for the workpiece 2 is disposed so as to be adjacent to the discharge flap 14. The support elements 13a, 13b each extend across the entire length of the gap 6 in the direction Y, delimiting the gap 6 in the direction X. The support elements 13a, 13b are displaceable in a controlled and mutually independent manner in the direction X. The width b of the gap 6 formed between the support elements 13a, 13b may be varied between a minimum gap width bMIN and a maximum gap width bMAX by moving the support elements 13a, 13b in the direction X, as is shown in FIG. 1. As an alternative to using support elements 13a, 13b that extend across the entire length of the gap 6, a plurality of support elements may also be used that are positioned in the Y direction so as to be mutually adjacent may also be used, or the support elements 13a, 13b may have a plurality of segments which in the direction Y are disposed beside one another and in the direction X are displaceable in a mutually independent manner, respectively.

The controlled movement of the support elements 13a, 13b in the direction X may be performed with the aid of spindle drives 57, for example, the spindle nut (not shown) being attached to the respective support element 13a, 13b, and the spindle 58 as well as the drive motor 59 being attached to one of the two workpiece bearing faces 4, 5. In some implementations the controlled movement of the support elements 13a, 13b for varying the width b of the gap 6 may also be implemented in another manner than in the manner described above.

The two support elements 13a, 13b have peripheral regions 16a, 16b which face the workpiece bearing faces 4, 5 and which are configured so as to be comb-shaped, corresponding to the peripheral regions 17a, 17b, which likewise are configured so as to be comb-shaped and which are attached to the first workpiece bearing face 4 and to the discharge flap 14. The corresponding peripheral regions 16a, 17a, and 16b, 17b, respectively, mutually mesh in the case of movement of the support elements 13a, 13b in the direction X such that in the case of movement of the support elements 13a, 13b in the direction X, for constriction of the gap 6, only small part-regions of the workpiece 2 are not supported between the first support element 13a and the first workpiece bearing face 4, and between the second support element 13b and the discharge flap 14, respectively.

The laser cutting head 9, with the aid of the mutually reliant movement units 11, 12, may be positioned both in the direction X as well as in the direction Y at any desired cutting head position XS, YS within the displacement range of the former, the maximum displacement path of the laser cutting head 9 in the direction X corresponding to the maximum width bMAX of the gap 6. Optionally, the laser cutting head 9 may also be displaced in a third movement direction Z (direction of gravity, hereunder the direction Z), so as to adjust a spacing between the laser cutting head 9 and the plate-shaped workpiece 2.

In order for machining by cutting to be controlled, the machine 1 has a controller unit 19 that serves for coordinating the movements of the workpiece 2, of the laser cutting head 9, as well as of the support elements 13a, 13b, so as to adjust a desired workpiece position W, a desired cutting head position XS, YS, as well as a desired position XUA, XUB of the support elements 13a, 13b in the direction X, in order to enable cutting using a predefined cutting contour and, if required, in order to support the workpiece 2 during machining by cutting.

The maximum width bMAX of the gap 6 is assumed when the comb-shaped peripheral regions 16a, 16b of the two support elements 13a, 13b are displaced that far in the direction X that the latter bear on the end sides of the comb-shaped peripheral regions 17a, 17b of the workpiece bearing 4 or of the discharge flap 14, respectively, that run in the direction Y. The bearing faces 15a, 15b of the support elements 13a, 13b, the upper side of the discharge flap 14, and the workpiece bearing faces 4, 5 in the direction Z are disposed at the same height.

The support elements 13a, 13b in the gap 6 may each be moved to a desired position XUA, XUB in the direction X, so as to there support the workpiece 2, more specifically workpiece parts 18 which are to be cut off from the workpiece 2 or are cut during machining, by means of a respective bearing face 15a, 15b. The controller unit 19 may adjust the width b of the gap 6 to a width b that is advantageous for machining by cutting of the respective workpiece part 18, so as to depend on the dimensions, in particular the width in the direction X as well as the thickness and thus the flexural rigidity of a respective workpiece part 18 to be cut.

In the case of comparatively large and flexurally rigid workpiece parts that cover the gap 6 when the latter assumes the maximum width bMAX thereof in the direction X, the gap width b during machining by cutting should be chosen to be as large as possible so as to avoid any contamination of the peripheries of the support elements 13*a*, 13*b*. In particular, such workpiece parts may be cut using a gap 6 having the maximum gap width bMAX.

At least when cutting off a small workpiece part 18 that is not flexurally rigid, as is shown in FIG. 1, at a separating cut position FP at which the last connection between the workpiece part 18 and the residual workpiece 2 is severed, the width b of the gap 6 should be reduced to a minimum gap width bMIN. The minimum gap width bMIN is determined by the requirement that there should be no contamination of or damage to the lateral and mutually facing peripheries of the support elements 13*a*, 13*b* by the laser beam 9 and any slag that may be formed during machining by cutting. A minimum gap width bMIN in the direction X, which would enable this may be approx. 3 mm. By way of the constriction of the gap 6 to the minimum gap width bMIN, the workpiece part 18 during separating cutting off may be supported in a planar manner by the support elements 13*a*, 13*b*, thus preventing tilting and in particular catching of the cut off workpiece part 18 on the residual workpiece 2*a*.

The movement of the support elements 13*a*, 13*b* may be performed so as to be synchronous with the movement of the laser cutting head 9 in the direction X, so as to at all times vary the position of the gap 6 in the direction X such that the laser beam 3 during movement thereof in the direction X is directed through the gap 6. Here, the movement of the support elements 13*a*, 13*b* in the direction X may be performed in a synchronous manner, i.e., the spacing between the position XUA of the first support element 13*a* and the position XUB of the second support element in the direction X, and thus the width b of the gap 6, remains constant during movement of the laser cutting head 9 in the direction X, except during separating cutting. The movement of the first support element 13*a* in the direction X need not be performed so as to be synchronous with the movement of the second support element 13*b* in the direction X, i.e., the spacing between the position XUA of the first support element 13*a* and the position XUB of the second support element 13*b* in the direction X, and thus the width b of the gap 6, may vary during movement of the laser cutting head 9 in the direction X. The latter is necessary, for example, in order for the gap 6 to be constricted prior to cutting off a workpiece part 18, i.e., prior to severing the last connection between the workpiece part 18 and the residual workpiece 2*a*. Varying the position of the gap 6 in the direction X while at the same time varying the gap width b is understood to mean that the position of the center of the gap is displaced in the direction X.

As is indicated by two arrows in FIG. 1, the two support elements 13*a*, 13*b* may be disposed at a desired position ZUA, ZUB in the direction Z below the workpiece bearing faces 4, 5. The controlled movement of the support elements 13*a*, 13*b* in the direction Z is performed with the aid of the controller unit 19 which, typically in a synchronous manner, lowers the support elements 13*a*, 13*b* in the direction Z such that the positions ZUA, ZUB of the support elements 13*a*, 13*b*, respectively, are congruent when moved in the direction Z. As soon as the two support elements 13*a*, 13*b* have been lowered sufficiently far below the workpiece bearing faces 4, 5 or the workpiece bearing tables, respectively, the support elements 13*a*, 13*b* are rapidly moved in the direction X in a synchronous and counteracting manner, e.g., at the same rate of acceleration or speed, respectively, such that the spacing in the direction X rapidly increases, the workpiece part 18 which bears on the bearing faces 15*a*, 15*b* of the support elements 13*a*, 13*b* being able to be downwardly discharged, ideally in a freely falling manner, without the workpiece part 18 being displaced in a lateral manner. It is self-evident that only workpiece parts 18 which completely bear on the bearing faces 15*a*, 15*b* of the support elements 13*a*, 13*b* but not on the comb-shaped peripheral regions 17*a*, 17*b* of the first workpiece bearing face 4 or of the discharge flap 14, respectively, may be discharged in the manner described. Alternatively or additionally to lowering the support elements 13*a*, 13*b*, the support elements 13*a*, 13*b* for discharging small workpiece parts 18 may also be downwardly pivoted so as to discharge the small workpiece parts 18 in a downward manner through the gap 6.

Figure 2A:
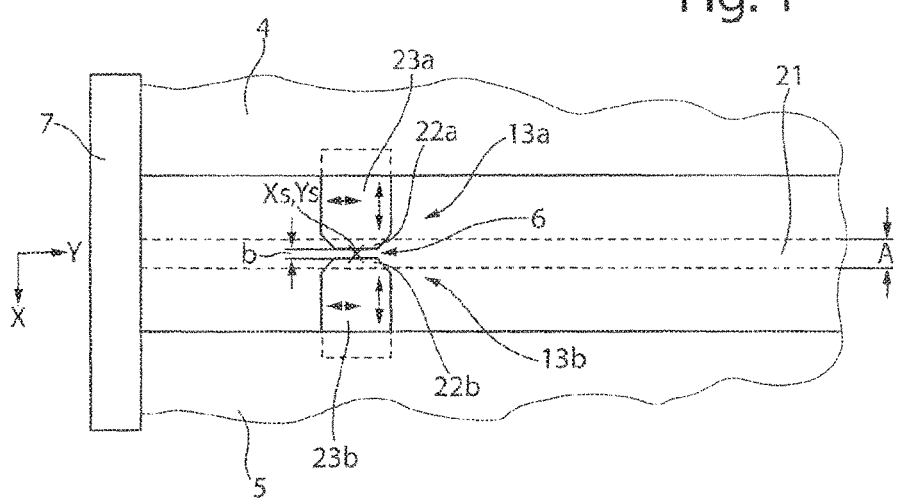
FIGS. 2A and 2B show illustrations of two support elements that are extendable from two workpiece bearing faces for adjusting a variable gap width of a gap formed between the support elements.
Figure 2B:
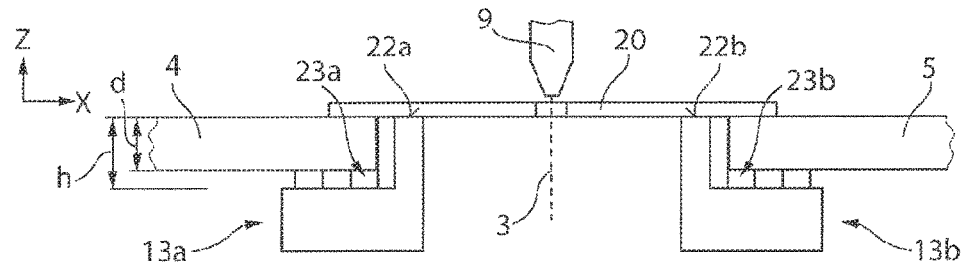

FIGS. 2A and 2B show a detail of an exemplary embodiment of a machine 1 in which, as opposed to what is shown in FIG. 1, two support elements 13*a*, 13*b* that are displaceable in a controlled manner both in the direction X as well as in the direction Y are provided. The first support element 13*a* is attached to the first workpiece bearing face 4, and the second support element 13*b* is attached to the second workpiece bearing face 5. The support elements 13*a*, 13*b*, or the gap 6 formed therebetween, respectively, in this case are/is conjointly guided both in the direction X as well as in the direction Y, so as to be synchronous with the movement of the laser cutting head 9, such that the cutting head position XS, YS at all times remains within the gap 6, i.e., the position of the gap 6 is adapted both in the direction X as well as in the direction Y to the cutting head position XS, YS. Coordinating the movements of the support elements 13*a*, 13*b* and of the laser cutting head 9 in the direction X as well as in the direction Y is performed with the aid of the controller unit 19.

As can be seen in FIG. 2A, the width b of the gap 6 formed between the support elements 13*a*, 13*b* may be chosen to be smaller than the maximum displacement range A of the additional movement unit 12, for example in order for a workpiece part (not shown) to be cut off at a separating cut position which is disposed in the gap 6. The maximum displacement range A corresponds to the width of a movement range 21 of the laser cutting head 9 or of the laser beam 3, respectively, in the direction X. In the case of machining by cutting large workpiece parts, which in the direction X completely cover the free space, which is formed between the two workpiece bearing faces 4, 5, it is favorable for the support elements 13*a*, 13*b* to be disposed as far as possible from the movement range 21 of the laser beam 3.

As can be seen in FIG. 2B, the support elements 13*a*, 13*b* in the case of machining by cutting such a workpiece part 20 may be partially retracted in the direction X under the workpiece bearing faces 4, 5. For this purpose, the bearing faces 15*a*, 15*b* of the support elements 13*a*, 13*b* shown in FIGS. 2A and 2B are divided into two, i.e., the bearing faces 15*a*, 15*b* each have one first part-region 22*a*, 22*b* of a radiation-resistant and hard material, for example a metallic material of copper, for example, and one second part-region 23*a*, 23*b* which is configured as a brush bearing. The two first part-regions 22*a*, 22*b* each are disposed so as to be immediately contiguous to the external edges of the bearing faces 15*a*, 15*b* that in the direction X are mutually opposite (cf. FIG. 2A), the gap 6 being formed therebetween. The first part-regions 22*a*, 22*b* each have a horizontally running surface, so as to enable planar support of the workpiece part 20 during separating cutting.

The second part-regions 23a, 23b that are configured as brush bearings have a plurality of brushes that are illustrated in an exemplary manner in FIG. 2B, which brushes, proceeding from a surface of the second part-region 23a, 23b that is offset downward by a brush height h in relation to the upper side of the first part-region 22a, 22b, extend upward so as to support the workpiece part 20. Since the brushes of the second part-region 23a, 23b that are configured as a brush bearing are flexible, the second support slides 13a, 13b may be partially displaced below the workpiece bearing faces 4, 5.

As is shown in FIG. 2B, a prerequisite therefor is that the extent d of the panel-shaped workpiece bearings 4, 5 below the bearing plane of the workpiece 2 is smaller than the brush height h. Optionally, the first part-region 22a, 22b may be dispensed with, i.e., the support elements 13a, 13b may be completely configured as brush bearings. In this case, the support elements 13a, 13b may be completely retracted under the workpiece bearing faces 4, 5. In this case, the support elements 13a, 13b for constricting the gap 6 may also be extended from the workpiece bearing faces 4, 5 and be moved into the position shown in FIG. 2A, for example.

Figure 3:
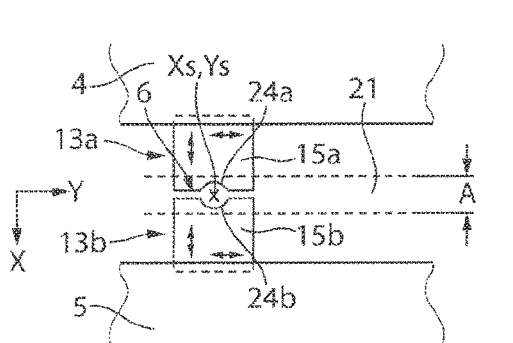
FIG. 3 shows an illustration of two support elements which each have a bearing face having a recess for the passage of a laser beam.

FIG. 3 shows an exemplary embodiment in which, in a manner analogous to that in FIGS. 2A and 2B, two support elements 13a, 13b are attached to the two mutually opposite peripheries of the workpiece bearing faces 4, 5, such that a gap 6 is formed between the support elements 13a, 13b. Both the first support element 13a as well as the second support element 13b, on external edges of the bearing faces 15a, 15b that in the direction X are mutually opposite, each have one semi-circular recess 24a, 24b. The two recesses 24a, 24b are positioned at the same location in the direction Y such that the recesses form a substantially circular opening for the passage of the laser beam 3 when the two support elements 13a, 13b are brought together in the direction X. The two recesses 24a, 24b enable the support elements 13a, 13b during separating cutting to be disposed so as to be immediately adjacent to one another such that the minimum width bMIN of the gap 6 during separating cutting is 0 mm, guaranteeing support of a workpiece part across the entire area during separating cutting.

By way of the complementary or mirror-symmetrical geometry, respectively, of the recesses 24a, 24b, and by way of the centric arrangement of the movement range 21 of the machining head 9 between the workpiece bearing faces 4, 5, controlling of the two support elements 13a, 13b may be simplified. It is self-evident that, in addition to constricting or widening the gap 6 by movement of the support elements 13a, 13b in the direction X, the position of the gap 6 in the direction X may also be varied. In particular, the position of the opening or of the recesses 24a, 24b, respectively, may be synchronized with the movement of the laser cutting head 9 in the direction X and the direction Y such that the laser beam 3 or the cutting head position XS, YS, respectively, is at all times positioned between the recesses 24a, 24b.

Figure 4:
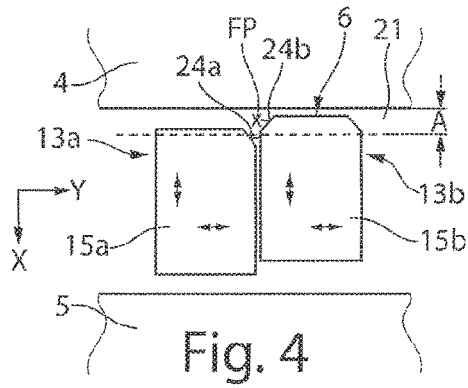
FIG. 4 shows illustrations of two support elements which are disposed so as to be mutually adjacent between two workpiece bearing faces.

FIG. 4 shows an exemplary embodiment in which the gap 6 is formed between the external edges of two support elements 13a, 13b, which are disposed beside one another in the direction Y, and the first workpiece bearing face 4. The movement range 21 of the machining head 9 in the case of the example shown in FIG. 4 is positioned so as to be adjacent to the first workpiece bearing face 4. The support elements 13a, 13b in the case of the example shown in FIG. 4 have a smaller width than the intermediate space which is formed between the workpiece bearing faces 4, 5. Therefore, the support elements 13a, 13b have a smaller mass and may be rapidly displaced in the direction X between the workpiece bearing faces 4, 5, so as to support tilting-prone workpiece parts in particular prior to the separating cutting.

FIG. 4 shows the position of the two support elements 13a, 13b just before a workpiece part is cut off at a separating cut position FP. In the example shown, the separating cut position FP is located within an opening which is delimited by two recesses 24a, 24b in the form of chamfered edges in the bearing faces 15a, 15b of the support elements 13a, 13b, and that are formed on mutually adjacent corners of the bearing faces 15a, 15b. As has been described in the context of FIG. 3, the support elements 13a, 13b may be displaced in a synchronous manner with the movement of the laser cutting head 9 both in the direction X as well as in the direction Y such that the laser beam 3 at all times is positioned within the opening which is delimited by the edges 24a, 24b. In the example shown, the support elements 13a, 13b are connected to a drive that is disposed in the region of the second workpiece bearing 5, so as to perform the controlled movement in the direction X as well as in the direction Y.

Figure 5A:
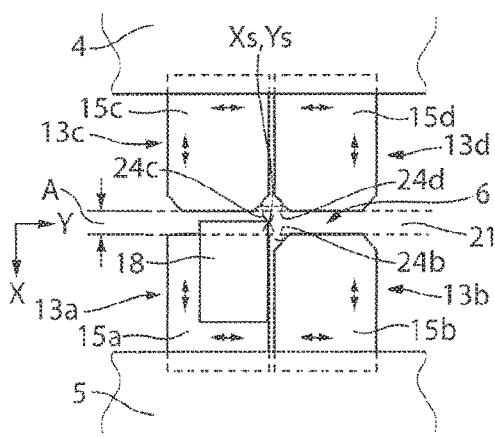
FIGS. 5A and 5B show illustrations of a four support elements which are disposed so as to be contiguous to a movement range of the laser beam (FIG. 5A), or for cutting off of a workpiece part constrict a gap formed between the support elements to a minimum width (FIG. 5B), respectively.
Figure 5B:
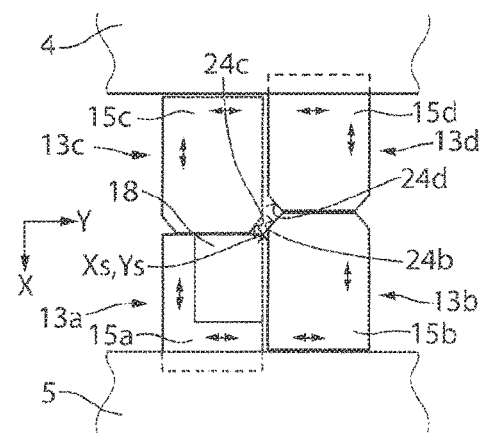

FIGS. 5A and 5B show a machine 1 in which the support elements 13a, 13b shown in FIG. 3, which in the direction X are disposed so as to be adjacent and which are attached to the second workpiece bearing face 5, are combined with two further support elements 13c, 13d which are attached to the first workpiece bearing face 4. In the example shown, the movement range 21 of the laser cutting head 9, and also the gap 6 are formed between the external edges of the bearing faces 15a, 15c of a first pair of support elements 13a, 13c, which external edges in the direction X are mutually opposite, and the external edges of the bearing faces 15b, 15d of the second pair of support elements 13b, 13d which in the direction Y is disposed so as to be adjacent. The corners of the bearing faces 15a-d of the four support elements 13a-d that are disposed so as to be mutually adjacent each have one recess in the form of a chamfered edge 24a-d, the chamfered edge of the first support element 13a being covered by a workpiece part 18 bearing thereon. As can be seen in FIG. 5A, the cutting head position XS, YS is located within an opening which is delimited by the recesses 24a-d and which is moved conjointly in a synchronous manner with the movement of the laser cutting head 9 in the direction X and in the direction Y.

By way of the four support elements 13a-d, which are displaceable in a controlled manner in the direction X and in the direction Y, the opening formed between the support elements 13a-d, or the recesses 24a-d, respectively, for the laser beam 3 during separating cutting of a workpiece part 18, by way of the interaction of the support elements 13a-d may be formed in a highly flexible manner, as is indicated in FIG. 5B in which a first pair of support elements 13a, 13c is slightly displaced in the direction X in relation to a second pair of support elements 13b, 13d which in the direction Y is adjacent. In this manner, the displacement path of the laser cutting head 9 when cutting off the workpiece part 18 may be adapted in a flexible manner to the external contour of the workpiece part 18.

In the example shown in FIGS. 5A and 5B, and in FIG. 3, the support elements 13a-d may be at least partially retracted under the workpiece bearing faces 4, 5. However, it is also possible for the support elements 13a-d to be disposed between the workpiece bearing faces 4, 5 such that the former may be moved only in the intermediate space formed between the workpiece bearing faces 4, 5. It is self-evident that in the case of the examples shown in FIGS. 2A and 2B, to FIGS. 5A and 5B, a discharge flap may be attached to one of the workpiece bearing faces 4, 5, as is shown in FIG. 1. In this case, the movement of the support elements 13*a*-*d* takes place between one of the workpiece bearing faces 4 and the discharge flap 14.

FIG. 6 shows a further exemplary embodiment in which a support element 13 is disposed between the first workpiece bearing face 4 and the discharge flap 14, the support element 13 being configured in the manner of a rail having two rail parts which in the direction Y extend across the entire length of the bearing faces 4, 5, forming a bearing face 15*a*, 15*b* divided into two parts which is for supporting a workpiece. A (residual) gap 6 having a minimum gap width bMIN is formed between the bearing faces 15*a*, 15*b* in the rail-shaped support element 13. In the example shown, the support element 13 is linked to the discharge flap 14 via an articulation 30 and by means of an actuator 31 may be retracted to a position located below the discharge flap 14. In the retracted position, the support element 13 in the direction X does not protrude beyond the discharge flap 14 such that an enlarged gap 6 is formed between the first workpiece bearing face 4 and the discharge flap 14, the width bMAX of the gap 6 corresponding to the spacing between the first workpiece bearing face 4 and the discharge flap 14 in the direction X. The width b of the gap 6 may be minimized from the maximum gap width bMAX to the minimum gap width bMIN by inwardly pivoting the rail-shaped support element 13, as is shown in FIG. 6. Typically, the support element 13 is pivoted into the gap 6 prior to cutting off small, tilting-prone workpieces, so as to support the workpiece part to be cut off in as planar a manner as possible. When such a workpiece part is being cut off, the laser beam 3 is positioned within the (residual) gap 6.

In an exemplary embodiment illustrated in FIG. 7, two support elements 13*a*, 13*b* are inwardly pivoted into the gap 6 between the first workpiece bearing face 4 and the discharge flap 14, so as to support a workpiece part during separative cutting by means of the respective bearing faces 15*a*, 15*b* of the support elements 13*a*, 13*b*. As has been described in FIG. 6, the support elements 13*a*, 13*b* may be retracted to a position that is located below the first workpiece bearing face 4, or below the discharge flap 14, respectively, so as to expose a gap 6 having a maximum gap width bMAX.

The support elements 13*a*, 13*b* are linked via a respective articulated connection 30*a*, 30*b* to the first workpiece bearing face 4 or to the discharge flap 14, respectively, and may each by means of an actuator (not shown) be pivoted from the position in which the former are inwardly pivoted into the gap 6 and the retracted position, the pivot axis running in the direction Y being formed on the articulated connection. Typically, the separating cut position in the case of small workpiece parts, i.e., in the case of workpiece parts of which the width is smaller than the maximum width bMAX of the gap 6, is chosen such that the cut off workpiece part bears on the bearing faces 15*a*, 15*b* of both support elements 13*a*, 13*b*, but not on the first workpiece bearing face 4 or on the discharge flap 14. In this manner, the cut off workpiece part by synchronous pivoting of the two support elements 13*a*, 13*b* to the retracted position may be discharged through the widened gap 6.

FIG. 8 shows a support element 13 in the form of a pivotable arm that may be pivoted from a position in which the former is inwardly pivoted into the gap 6, in which a bearing face 15 formed on the end side or on the edge of the arm, respectively, supports a workpiece part 18 to be cut off, to a retracted position which is located below the discharge flap 14 and in FIG. 8 is illustrated with dashed lines. As has been described in the context of FIGS. 6 and 7, the pivoting movement is performed about a pivot axis which runs in the direction Y and which is formed on an articulation 30.

Differing from the external edge of the discharge flap 14 that faces the gap 6, the edge of the pivot arm forming the support element 13 has no chamfer, such that the cut off workpiece part 18 is supported by the edge of the support element 13 that forms the bearing face 15. The width b of the gap 6 is reduced from the maximum width bMAX to the minimum gap width bMIN by inwardly pivoting the arm. As is shown in FIG. 8, the workpiece part 18 during separative cutting substantially bears on the upper side of the discharge flap 14, the separating cut position FP being located close to the external edge of the discharge flap 14. The pivot arm serving as the support element 13 is inwardly pivoted so as to prevent tilting of the workpiece part 18 into the gap 6 during separative cutting.

Substantially semi-circular or oval recesses 24, respectively, in a comb-shaped arrangement are formed on the inwardly pivotable support element 13 shown in FIG. 9, on an external edge 26 of the bearing face 15 that faces the gap 6, i.e., in each case two adjacent recesses 24 in the direction Y are positioned so as to be equidistant from one another. The pivoting movement of the support element 13 is performed as has been described in the context of FIG. 6, wherein, differing from the support element 13 shown in FIG. 6, the (constricted) gap 6 is formed between the first workpiece bearing face 4 and the comb-type external edge 26 of the support element 13.

In order for the gap 6 to be constricted, the support element 13 is inwardly pivoted just before a workpiece part is cut off, so as to cut off the workpiece part at a separating cut position which is disposed within one of the recesses 24. In the case of the example shown in FIG. 9, the support element 13 may be inwardly pivoted into the gap 6 without the laser beam 3 having to be switched off for this purpose. It is self-evident that the support element 13 in the case of the example shown in FIGS. 6 and 9 alternatively may be connected in an articulated manner to the first workpiece bearing face 4, so as to be pivoted to a retracted position which is located below the first workpiece bearing face 4.

FIG. 10 shows an exemplary embodiment in which, as is the case in FIG. 7, an inwardly pivotable support element 13*a*, 13*b* is attached to either side of the gap 6, the inwardly pivotable support element 13*a*, 13*b* being able to be inwardly pivoted from a retracted position under the first workpiece bearing 4 or under the discharge flap 14, respectively, into the gap 6. Linking to the first workpiece bearing 4, or to the discharge flap 14, respectively, is implemented via a respective articulated connection 30*a*, 30*b*, the pivoting movement being implemented via a respective actuator 31*a*, 31*b*. The mutually facing external edges 26*a*, 26*b* of the bearing faces 15*a*, 15*b* of the two support elements 13*a*, 13*b* have substantially semi-circular or oval recesses 24, in each case in a comb-shaped arrangement. In each case two of the recesses 24 in the direction Y are disposed so as to be mutually opposite such that an opening in which the laser beam 3 may be positioned for cutting off a workpiece part is formed between the recesses 24. Small workpiece parts which bear only on the two bearing faces 15*a*, 15*b* of the support elements 13*a*, 13*b*, may be downwardly discharged from the gap 6 by synchronous pivoting of the two support elements 13*a*, 13*b* to the respective retracted position. It is self-evident that optionally only one of the support elements 13*a*, 13*b* is pivoted to the retracted position for discharging small workpiece parts which bear only on one of the two bearing faces 15*a*, 15*b*.

FIG. 11 shows a pivotable support element 13 that in an analogous manner to FIG. 9 in the region of the external edge 26 thereof that faces the gap 6 is configured in a comb-type manner. In the case of the example shown in FIG. 11, the support element 13 is linked to the first bearing face 4. As opposed to the example shown in FIG. 9, recesses 24a, 24b of different sizes are formed on the external edge 26 of the bearing face 15 of the support element 13, the two types of recesses 24a, 24b alternating in the direction Y. Small workpiece parts, which during separative cutting bear only on the two support elements 13a, 13b, are typically cut off within the small recesses 24a, while larger workpiece parts which at least partially bear on the discharge flap 14 are typically cut off at a separating cut position FP that is disposed in the large recesses 24b, as is shown in FIG. 12 which in a manner analogous to that of FIG. 10 shows an exemplary embodiment in which two support elements 13a, 13b for supporting a workpiece part 20 to be cut off may be inwardly pivoted into the gap 6.

To guarantee the highest possible flexibility when workpiece parts are being cut off, the support elements 13, 13a, 13b shown in FIGS. 9 to 12 are configured so as to be displaceable in the direction Y. The movement range, i.e., the potential positions YUA, YUB of the support elements 13, 13a, 13b in the direction Y is typically limited to the spacing between the centers of two adjacent recesses 24, or to the spacing between the centers of two adjacent small recesses 24a, or large recesses 24b, respectively. Such a movement range of the support elements 13, 13, 13b is sufficient, since a recess 24, 24a, 24b that is suitable for separating cutting, by way of suitable positioning of the support elements 13, 13a, 13b in the direction Y, may be disposed at any arbitrary separating cut position FP in the direction Y.

In addition to the possibilities described above, there are inter alia the following further possibilities for discharging a cut off workpiece part 18, 20: alternatively or additionally to the lowering movement or to the pivoting movement of the support elements 13, 13a, 13b per se, respectively, the bearing faces 15, 15a, 15b of the latter may be configured so as to be height-adjustable and/or pivotable in relation to a main body of the support elements 13, 13a, 13b. The movement of the bearing faces 15, 15a, 15b in this case is performed in the manner as has been described above in the context of the height-adjustable or pivotable support elements 13, 13a, 13b, respectively. The lowering movement and moving apart of two of the support elements 13a, 13b may also be performed in a superimposed manner so as to enable highly dynamic discharging.

When discharging a workpiece part 20 via the discharge flap 14, the latter may initially be lowered, so as to prevent catching of the cut off workpiece part 20 on the residual workpiece 2. A more rapid tilting or pivoting movement, respectively, by means of which workpiece parts 20 which at least partially bear on the discharge flap 14 may be downwardly removed from the machining region, may follow the comparatively slow lowering movement of the discharge flap 14. As an alternative to a discharge flap 14 which, as has been described above, extends across the entire length of the gap 6 in the direction Y, one discharge flap which is segmented in the direction Y, or two or more discharge flaps, may also be used, respectively.

It is likewise possible for cut off workpiece parts to be upwardly discharged, for example by using suction or magnetic grippers. In the case where the workpiece bearing faces 4, 5 are configured in the manner of a conveyor belt, and thus differ from those shown in FIGS. 1 and 2, cut off workpiece parts may also be discharged by moving such a conveyor belt in the direction X.

As an alternative to moving support elements 13, 13a, 13b for varying the width of the gap 6 or the position of the gap 6 in the direction X, respectively, one workpiece bearing face or both workpiece bearing faces 4, 5, for example, may also be configured so as to be displaceable in the direction X. For example, the first workpiece bearing face 4 may be moved in the direction toward the discharge flap 14, so as to constrict the gap 6 during separating cutting. In this case, it is favorable for the center of gravity of the workpiece part to be cut off to be located above the discharge flap 14. Instead of the entire workpiece bearing face(s) 4, 5, optionally only a part-region of the workpiece bearing faces 4, 5 that is disposed so as to be adjacent to the gap 6 may be displaced in the direction X, so as to vary the gap width or the position of the gap 6 in the direction X, respectively.

Other Embodiments

In summary, improved planar support of workpiece parts may be performed in the manner described above during machining by cutting, in particular in the case of separating cutting, by reducing the gap width. Simplified discharging of cut off workpiece parts may also be implemented by varying the width of the gap.

What is claimed is:

1. A machine for the separative machining of a plate-shaped workpiece into at least one workpiece part and a residual workpiece by a processing beam, the machine comprising:
    a first movement unit configured to move the workpiece in a first direction (X);
    a second movement unit comprising a machining head configured to emit the processing beam, wherein the second movement unit is configured to move the machining head in a second direction (Y) perpendicular to the first direction (X) to direct the processing beam onto the workpiece;
    a first workpiece support unit including a first workpiece bearing face for supporting the workpiece;
    a second workpiece support unit including a second workpiece bearing face for supporting the workpiece, wherein the first workpiece support unit and the first workpiece bearing face are spaced apart by a gap from the second workpiece support unit and the second workpiece bearing face, wherein the gap extends along the second direction (Y), wherein one or more of at least a part of the first workpiece support unit, at least a part of the second workpiece support unit and at least one support element that is movable between the first workpiece bearing face and the second workpiece bearing face are configured to move with respect to one another in the first direction (X) to vary the width (b) of the gap; and
    a third movement unit for moving the machining head in the first direction (X) within the gap.

2. The machine of claim 1, wherein the third movement unit is configured to have a maximum displacement range (A) in the first direction (X) that corresponds to a maximum width (bMAX) of the gap.

3. The machine of claim 1, further comprising a controller unit configured to actuate a drive unit to move one or more of at least a part of the first workpiece support unit and at least a part of the second workpiece support unit to cause a reduction in the width (b) of the gap to a minimum gap width (bMIN) when cutting off a workpiece part to be supported, the minimum gap width (bMIN) being smaller than a maximum displacement range (A) of the third movement unit in the first direction (X).

4. The machine of claim 3, wherein the controller unit is configured to actuate a drive unit to move one or more of at least a part of the first workpiece support unit and at least a part of the second workpiece support unit to cause a reduction in the width (b) of the gap to a minimum gap width (bMIN) that is required for the passage of the processing beam when cutting off a workpiece part to be supported.

5. The machine of claim 1, wherein the position of the gap in the first direction (X) is variable so as to be synchronous with the movement of the machining head in the first direction (X).

6. The machine of claim 1, wherein the width (b) of the gap is variable by movement of one or more of at least one of the workpiece bearing faces in the first direction (X), by movement of at least one part of at least one of the workpiece bearing faces in the first direction (X), and by movement of at least one support element that is movable between the workpiece bearing faces in the first direction (X), the at least one support element having a bearing face for supporting workpiece parts that are cut during separative machining.

7. The machine of claim 6, wherein the controller unit is configured for controlling the movement of one or more of the at least one of the workpiece bearing faces, the at least one part of at least one of the workpiece bearing faces, and of the at least one support element such that when cutting off a workpiece part to be supported, the width (b) of the gap is reduced to a minimum gap width (bMIN) that is smaller than a maximum displacement range (A) of the third movement unit in the first direction (X).

8. The machine of claim 7, wherein the controller unit is configured for controlling the position of the gap in the first direction (X) such that a separating cut position (FP) of the workpiece part (18) to be supported is positioned within the gap having the minimum gap width (bMIN).

9. The machine of claim 6, wherein the controller unit is configured for controlling the movement of one or more of the at least one of the workpiece bearing faces, the at least one part of at least one of the workpiece bearing faces, and of the at least one support element, such that the gap when cutting workpiece parts that cover the gap in the first direction (X) has a maximum gap width (bMAX).

10. The machine of claim 6, wherein at least one peripheral region of a support element that faces a workpiece bearing face, and at least one peripheral region of at least one of the workpiece bearing faces that faces the support element is configured to be comb-shaped.

11. The machine of claim 6, wherein the at least one support element is configured so as to be extendable from one of the workpiece bearing faces.

12. The machine of claim 6, further comprising a drive unit configured to displace the at least one support element in a controlled manner in the second direction (Y).

13. The machine of claim 6, wherein at least one support element on an external edge of the bearing face that faces the gap has a recess for the passage of the processing beam.

14. The machine of claim 6, wherein one or more of the bearing face of the at least one support element and the at least one of the support element per se is configured for displacement in the direction of gravity.

15. The machine of claim 6, wherein one or more of the bearing face of at least one support element and at least one of the support elements per se are downwardly pivotable.

16. The machine of claim 1, wherein at least one support element is configured to pivot inwardly between the workpiece bearing faces to reduce the width (b) of the gap, wherein the support element has a bearing face for supporting workpiece parts cut during separative machining.

17. The machine of claim 16, wherein at least one support element on an external edge of its bearing face that faces the gap has at least one recess to enable passage of the processing beam.

18. The machine of claim 16, wherein an inwardly pivotable support element is disposed on a first and second side of the gap, mutually facing external edges of the inwardly pivotable support elements each having at least one recess in the inwardly pivotable support element to enable passage of the processing beam.

19. A method for separative machining of a workpiece on a machine, the method comprising:
setting the width (b) of a gap formed between a first workpiece support unit including a first workpiece-bearing face for supporting the workpiece and a second workpiece support unit including a second workpiece bearing face for supporting the workpiece, wherein the width (b) is set in dependence on at least one of a size, a shape and a thickness of a workpiece part to be cut; and
machining the workpiece via a first movement unit configured to move the workpiece in a first direction (X), a second movement unit comprising a machining head configured to emit the processing beam, wherein the second movement unit is configured to move the machining head in a second direction (Y) perpendicular to the first direction (X) to direct the processing beam onto the workpiece, and a third movement unit for moving the machining head in the first direction (X), wherein one or more of at least a part of the first workpiece support unit, at least a part of the second workpiece support unit and at least one support element that is movable between the first workpiece bearing face and the second workpiece bearing face are configured to move with respect to one another in the first direction (X) to vary the width (b) of the gap.

20. The method of claim 19, wherein the gap is conjointly moved so as to be synchronous with the movement of the machining head in the first direction (X).

21. The method of claim 19, further comprising moving one or more of at least a part of the first workpiece support unit, at least a part of the second workpiece support unit and the at least one support element when cutting off a workpiece part so as to reduce the width (b) of the gap to a minimum gap width (bMIN) that is smaller than a maximum displacement range (A) of the third movement unit in the first direction (X).

22. The method of claim 19, further comprising widening the gap by moving one or more of at least a part of the first workpiece support unit, at least a part of the second workpiece support unit and the at least one support element for discharging a cut off workpiece part.

23. The method of claim 22, wherein the gap is widened by a counteracting and in particular synchronous movement of at least two support elements in the first direction (X).

24. The method of claim 19, further comprising downwardly pivoting at least one of the bearing face of the at least one support element and the at least one support element per se for discharging the cut off workpiece part.

25. The method of claim 19, further comprising lowering at least one of the bearing face of the at least one support element and the support element per se prior to discharging or during discharging of the cut off workpiece part.

26. A non-transitory computer-readable storage device storing computer executable instructions for regulating separative machining of a workpiece in a machine that, if executed by a computer system, causes the computer system to:

set the width (b) of a gap formed between a first workpiece support unit including a first workpiece-bearing face for supporting the workpiece and a second workpiece support unit including a second workpiece bearing face for supporting the workpiece, wherein the width (b) is set in dependence on at least one of a size, a shape, and a thickness of a workpiece part to be cut; and machine the workpiece via a first movement unit configured to move the workpiece in a first direction (X), a second movement unit configured to move a machining head configured to emit the processing beam, wherein the second movement unit is configured to move the machining head in a second direction (Y) perpendicular to the first direction (X) to direct the processing beam onto the workpiece, and a third movement unit for moving the machining head in the first direction (X), wherein one or more of at least a part of the first workpiece support unit, at least a part of the second workpiece support unit and at least one support element that is movable between the first workpiece bearing face and the second workpiece bearing face are configured to move with respect to one another in the first direction (X) to vary the width (b) of the gap.

* * * * *